United States Patent [19]

Johnson, Jr.

[11] 4,078,682

[45] Mar. 14, 1978

[54] TRAILER VAN ADAPTED TO TRANSPORT COMPRESSIBLE MATERIALS

[76] Inventor: James Nelson Johnson, Jr., Strick Corporation, 4525 S. Interstate 85, Charlotte, N.C. 28208

[21] Appl. No.: 761,812

[22] Filed: Jan. 24, 1977

Related U.S. Application Data

[63] Continuation of Ser. No. 576,899, May 12, 1975.

[51] Int. Cl.² .................................................. B60P 1/00
[52] U.S. Cl. ................................................... 214/83.3
[58] Field of Search .................. 214/82, 83.3, 83.24; 100/278, 229, 219

[56] References Cited

U.S. PATENT DOCUMENTS

| | | | |
|---|---|---|---|
| 2,530,350 | 11/1950 | Ehlert | 214/82 |
| 2,726,776 | 12/1955 | Myers | 214/82 |
| 3,211,308 | 10/1965 | Glass | 214/82 |
| 3,796,330 | 3/1974 | Dehner | 100/278 X |

*Primary Examiner*—Albert J. Makay
*Attorney, Agent, or Firm*—Connolly and Hutz

[57] ABSTRACT

A standard trailer van is disclosed which is adapted to load compressible materials in sequential steps resulting in a compressed product which allows larger quantities of the compressible product to be loaded than heretofore known. The adapted van includes a power winch and pulley arrangement located beneath the trailer van and a cable assembly which is a part of and controlled by the pulley arrangement. The cable assembly is connected to a moveable bulkhead which is used to force the compressible materials into a compressed state when activated by the power winch.

9 Claims, 3 Drawing Figures

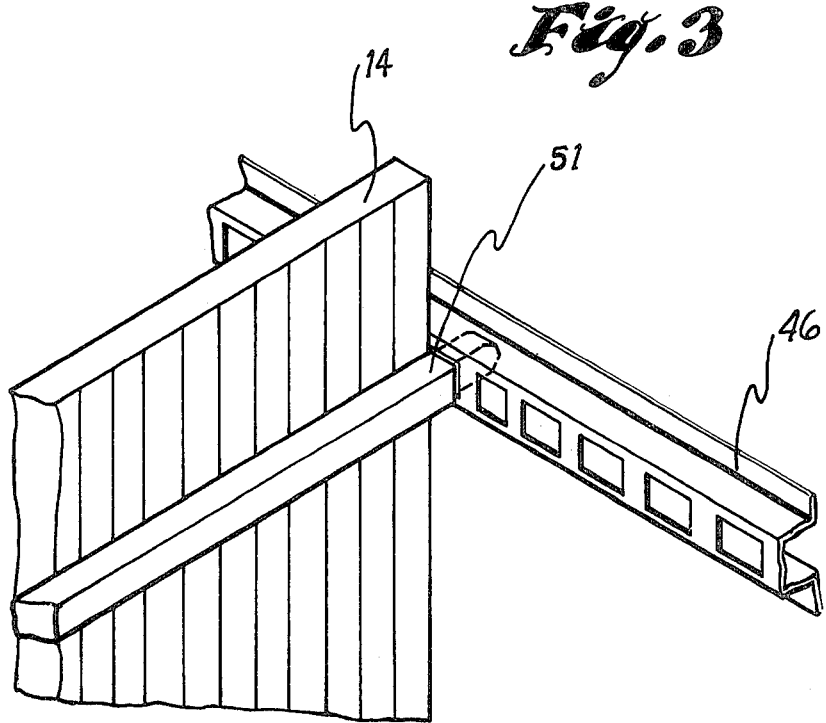

TRAILER VAN ADAPTED TO TRANSPORT COMPRESSIBLE MATERIALS

This is a continuation of application Ser. No. 576,899, filed May 12, 1975.

FIELD OF THE INVENTION

This invention relates to a method and apparatus for improving the capacity of trailers in transporting compressible materials. More particularly this invention relates to a method and apparatus for improving the capacity of long haul trailers of a normal length of about forty to forty-five feet for transporting any compressible material such as, but not limited to, polyurethane foam products, foam rubber, rubber tires and the like. This invention is accomplished by equipping a long haul trailer with a power winch and pulley arrangement with cable assembly located beneath the trailer and providing inlet means for said cable assembly to enter the interior of the trailer. In operation, the cable assembly is removably attached to a bulkhead which is employed to push the foam material into a state of compression which in turn is releasably engaged with a track member running the length of said trailer.

DESCRIPTION OF THE PRIOR ART

Various methods for handling compressible materials in vans or trailers have been disclosed. U.S. Pat. No. 3,741,416 Patrick J. Bilbow discloses a method for storing foam buns in a van in a vertical manner with a power operated platen disposed between adjacent buns. This technique was employed to equalize the state of compression in all the buns. While this contribution to the art might have accomplished the result for which it was intended, it will not succeed as a commercially acceptable technique. Initially, the cost of power operated platens which in number would equal, less one, the total buns being shipped, would be a deterrent. Secondly, the time element of loading and unloading each shipment would adversely affect its utilization. Thirdly, additional handling equipment such as a fork lift and the like would be required to lift the load to the top of the trailer for loading purposes.

Another method for storing compressible materials, such as foam, in a trailer is disclosed in U.S. Pat. No. 3,796,330 issued to Charles Vincent Dehner. In this patent, a horizontal loading procedure is disclosed; however, a chain drive assembly is employed to move a bulkhead which compresses the foam material. The chain drive assembly, however, takes up valuable cargo space in the van and/or trailer. Additionally, the chain itself is a dirty and abrasive material (such as is commonly used on a bicycle) and must be completely housed to prevent contact with the foam material. If the chain did come into contact with the foam material, the shipped material would become ripped and torn. To prevent this from happening, protective shields or housings must be employed, which take up additional cargo space. In view of the fact that the prime reason for employing such techniques is to achieve the maximum utilization of cargo space, the Dehner invention goes only half way.

SUMMARY

This invention enables the shipper to use 100 percent of his available cargo space, as the pulley arrangement and cable assembly are primarily located outside the van or trailer. Additionally, this invention enables the shipper to obtain a gain in excess of four hundred percent of material shipped with each trailer over that of a shipment of non-compressed foam material.

DESCRIPTION OF THE DRAWINGS

These and other objects and advantages of the present invention are specifically set forth in or will become apparent from the following detailed description of a preferred form of the invention when read in conjunction with the accompanying drawings wherein.

Figure 1:
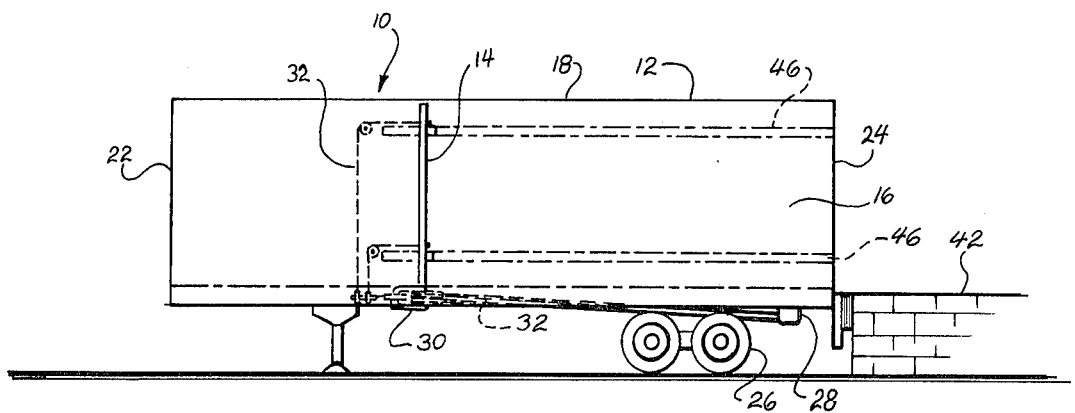
FIG. 1 is a longitudinal side view of a trailer constructed in accordance with the principals of this invention and filled with one load of the compressible material to be transported.

The trailer, generally designated by the numeral 10, includes as its major components an enclosure 12 and a bulkhead 14 shiftably mounted within an interior space 16 defined by enclosure 12. Enclosure 12 is of box-like overall configuration having a roof 18, a floor 20, a permanently closed end wall 22, side walls, not shown, and swingable door means 24 pivotally secured to said side walls. This overall construction of the enclosure 12 is similar to that of a conventional trailer and is provided with an underlying wheeled chassis 26.

The bulkhead 14 is preferably constructed of a light weight high strength material such as aluminum, magnesium and the like, and combinations thereof. The material must be light weight to facilitate its use as hereinafter described by a minimum of people. The bulkhead must be of high strength to withstand the pressures generated by the compressed foam material. For the same reason, it has been found preferable to reinforce all component structures of the trailer with a double layer of material.

A power winch 28 is shown attached to the under portion of the trailer floor 20 with a pulley arrangement connected therewith. The forward floating block assembly 30 of the pulley arrangement is connected to the power winch 28 by a cable assembly 32. The cable assembly continues from the forward floating block 31 into the trailer by means of cables directed by pulleys 48 and is removably attached to the bulkhead 14 at points 44 as shown in FIG. 2 where locking or pulling bars 50 are situated.

Figure 2:
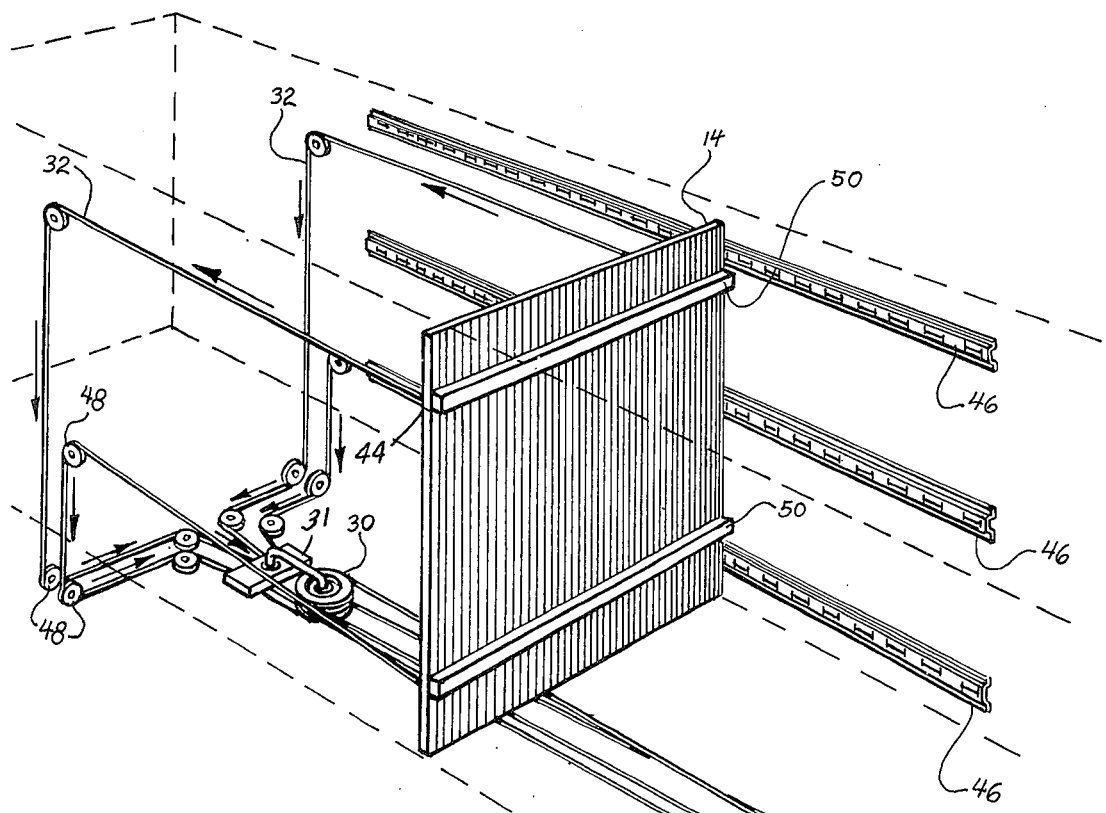
FIG. 2 is a perspective view of the winch, pulley arrangement, cable assembly and bulkhead.

For a more complete description of the pulley arrangement reference is made to FIG. 2. The winch 28 and forward floating block assembly 30 are depicted showing a pulley ratio of 4:1. With regard to the drawing, one end of the cable is fixedly attached to the winch at point 34. The cable then goes to one pulley in the forward floating block assembly 30, is then led back to an idler pulley 36, returns to the second of the double stacked pulleys in the forward floating block assembly 30 and returns to anchor point 38.

It has been found that the idler pulley 36 and anchor point 38 are preferably located aft of the power winch and must be situated between the flanges 40 of the winch drum. In practicing this invention, it was attempted to locate the anchor point outside the winch drum flanges; however, the effectiveness of the mechanism was seriously impeded, as it created undue stress causing the cable to break on repeated occasions.

For purposes of this invention, a commercially available 7.5 horsepower electric winch was employed. This particular winch has the capacity to pull a maximum of 6,000 pounds. A smaller winch can be used in this invention, but it might have difficulty in achieving the results desired due to the high pressure generated as the foam material attains its compressed state. A higher powered winch can be employed; however, the size of such motor limits its usefullness due to the fact that this invention calls for the winch to be securably attached to the underportion of the trailer.

While FIG. 2 depicts a pulley ratio of 4:1 in the pulley arrangement, ratios as high as 3:1 and as low as 5:1 may be employed. The 4:1 ratio, based on the maximum motor pull of 6,000 pounds, enables one to attain a total maximum pull of 24,000 pounds. The 5:1 ratio slows down the operation of this invention, but is tolerable. The lower the ratios go, i.e. 5:1 and lower, the more complicated the pulley arrangement becomes and the power generated increases, which is not essential to the operation of this invention. As the ratios are increased, i.e. 3:1 and higher, it has been found that the cable assembly and consequently the bulkhead moves faster. This increased speed, however, is achieved with less pressure. The higher ratios speed up loading times, but as the ratios get higher, such as 2:1, the pressure generated falls off, thus hindering the ability of the bulkhead to compress the compressible materials to the most desirable degree of compaction.

DESCRIPTION OF THE INVENTION

In the preferred operation of this invention, the trailer 10 is backed up to a loading dock 42 and the trailer is completely filled with a succession of compressible foam material. The entire length of the trailer is filled and in addition the foam materials are continued onto the loading dock to a distance of about 50 percent of the length of the trailer. So, when a standard over-the-road trailer is employed, which has a normal length of about 46 feet, the foam materials are stacked one after the other for the total length of the trailer and for an additional 50 percent outside the trailer. We have found that we can initially line up about 66 to 70 lineal feet of material for the first loading. Once the foam compressible material is in line, a bulkhead is placed against the last material in the line. Two pulling bars 50 are placed against the outside of the bulkhead in a horizontal position, about one-fourth of the distance from the top and bottom of the bulkhead respectively. The cable assembly and extensions thereof, which run the length of the interior of the trailer, are connected to each of the ends of the pulling bars which are provided with clips to accept the cable assembly, and the winch is activated. As the cable assembly pulls the bulkhead into the trailer, the foam compressible material is then compressed or squeezed into the trailer until the desired compression is attained. Thus, 66 to 70 lineal feet of material could be compressed until one-third of the van is filled, in this example 22 to 24 feet. The bulkhead 14 is then secured to the side walls of the trailer by means of a locking bar 51 removably inserted into track members 46 running the interior length of the trailer. The pulling bar and locking bar are substantially the same with two exceptions. The pulling bar is as long as the width of the bulkhead and is provided with clips to accept the cable assembly. This is so in order to allow the unimpeded movement of the bulkhead. The locking bar is as long as the width of the trailer or van and, when inserted in place into the track members, locks the bulkhead in position.

While the drawings depict two pull bars, the trailer can be provided with three track members 46 as set forth in FIG. 2. In the event excess pressures are built up against the bulkhead 14, three locking bars may optionally be employed to insure that the bulkhead remains in place.

Once the first load has been completed, the cable assembly is removed from the secured bulkhead, the four cables are drawn the length of the trailer out to the loading dock, and the process is repeated until the van is filled for transporting. We have found that this method can be done in from two to four steps depending upon the material being transported and the degree of compaction desired. We have also found that due to the use of bulkheads which separate the cargo, loads of two different compressible materials may be shipped in the same trailer or van.

With respect to the cable assembly, the four lines coming off the forward floating block assembly are directed by means of pulleys 48 to enter the trailer and run the length thereof until ultimately connected with the pulling bars. Since the lines come from a common source, they act in concert, resulting in a uniform pull on the bulkhead. In fact, the cable assembly must act in concert to achieve a uniform pressure on the bulkhead as the foam material is compressed.

We have also found that by employing a cable assembly and pulley arrangement as a means for moving the bulkhead, the trailer or van can be loaded in a more expeditious manner with a more efficient use of cargo space than heretofore known. The bulkhead 14 will move foot for foot with the forward floating block assembly 30. Additionally, all the means of moving said bulkhead are located outside the trailer or van, which results in increased amounts of cargo being shipped per load with the decrease, if not elimination, of damage done to the transported product which had been caused by the use of chains and the like as hereinbefore described.

The following examples illustrate the operation of this invention:

EXAMPLE I

A trailer of 46 feet in length, 8 feet in width and 116 inches in height was loaded with polyurethane foam byns of 85" × 112" having a density of 1.4 pounds per cubic foot. A 7½ horsepower winch and a pulley ratio of 4:1 were employed. In this first series of examples only the interior length of the trailer was employed for loading purposes, as initially 46 feet of the compressible material was placed in the van, and the bulkhead was put in position as hereinbefore described. In this series of examples three bulkheads were employed, i.e., the process was repeated three times, and there was free standing space left at the end of the filled trailer at the conclusion of the three steps.

|    | percent compression | board feet stored[1] | percent gain |
|----|---------------------|----------------------|--------------|
| 1A | 0                   | 25,000               | 0            |
| 1B | 100%                | 70,694               | 283%         |
| 1C | 125%                | 76,741               | 307%         |
| 1D | 150%                | 81,467               | 326%         |
| 1E | 175%                | 86,567               | 346%         |
| 1F | 200%                | 90,635               | 362%         |

[1] One board foot equals 144 cubic inches of stored material or a board of the dimensions of 12" × 12" × 1".

EXAMPLE II

Example I was repeated with the same size trailer and same compressible material; however, a 24-foot funnel was additionally used for loading purposes. Therefore, whereas in Example I the initial load of compressible material consisted of 46 feet, this example loads 70 feet initially. Due to this extra loading, 24-foot extension cables were employed in order that the cable assembly could attach to the pulling bars which were placed against the bulkhead. Additionally, in this series of examples, only two bulkheads were employed.

|    | percent compression | board feet[1] stored | percent gain | percent gain improvement over Example I |
|----|---------------------|----------------------|--------------|------------------------------------------|
| 2A | 0                   | 25,000               | 0            | 0                                        |
| 2B | 100%                | 75,188               | 300%         | 6.4%                                     |
| 2C | 125%                | 84,750               | 339%         | 10.4%                                    |
| 2D | 150%                | 91,534               | 366%         | 11.8%                                    |
| 2E | 175%                | 97,255               | 389%         | 12.5%                                    |
| 2F | 200%                | 101,177              | 405%         | 11.6%                                    |

[1]One board foot equals 144 cubic inches of stored material or a board of the dimensions of 12" × 12" × 1".

While these examples used the stated statistics, it is within the purview of this invention to adjust the perimeters within the limits disclosed in the specification to accomplish equally advantageous results.

What is claimed is:

1. A van for transporting compressible materials comprising:
   a. an enclosure having two sides, a top and a bottom and two ends, to receive the materials.
   b. a bulkhead disposed within the enclosure.
   c. pulling bars removeably positioned against the bulkhead.
   d. a cable assembly removeably attached at one end to the pulling bars, to move the bulkhead, and to a forward floating block of a pulley arrangement at the other end.
   e. a pulley arrangement in the cable assembly fixedly attached to a power winch at one end.
   f. the power winch located outside the enclosure.
   g. track members fixedly attached to the side walls of the enclosure.
   h. locking bars less than the width of the enclosure but wider than the bulkhead removeably engaged with said track members.
   i. the pulling bars being of a length substantially equal to the width of the bulkhead.
   j. the cable assembly being constructed and arranged to permit the pulling bars and bulkhead to be disposed a substantial distance outside of the enclosure and outside of the rear of the van to permit a substantial amount of the compressible materials longer than the length of the van to be initially pulled within it by the cable assembly, pulling bars and bulkhead.

2. The van of claim 1 wherein the cable assembly comprises four cables originating from a common forward floating block and traveling to the sides of the bulkhead by means of pulleys so as to act in concert providing a uniform pull to the bulkhead.

3. The van of claim 1 wherein the pulley arrangement has a pulley ratio of from about 2:1 to about 5:1.

4. The van of claim 1 wherein the winch is located beneath the enclosure and comprises a motor and a drum for collecting cable wherein the drum has flanges at each end.

5. The van of claim 4 wherein the pulley arrangement is fixedly attached to the winch wherein the anchor point is situated between the flanges of the winch drum.

6. The van of claim 5 wherein the pulley arrangement has an idler located between the flanges of the winch drum.

7. The van of claim 6 wherein the winch has a motor of about 7.5 horsepower.

8. The van of claim 6 wherein the bulkhead is an object of high strength, low weight material.

9. The van of claim 8 containing at least two track members located on each side of said enclosure, the track members being parallel to each other and located about one-third of the distance from the top and the bottom respectively.

* * * * *